United States Patent [19]

Piazza et al.

[11] 4,252,767

[45] Feb. 24, 1981

[54] COMPOSITE BUILDING MODULE

[75] Inventors: Matthew R. Piazza, Nichols; David E. Zimmer, Bridgeport, both of Conn.

[73] Assignee: Daniel Zimmer, Trumbull, Conn.

[21] Appl. No.: 587,749

[22] Filed: Jun. 17, 1975

Related U.S. Application Data

[63] Continuation-in-part of Ser. No. 531,022, Dec. 9, 1974, abandoned.

[51] Int. Cl.$^2$ ............................................. B28B 1/08
[52] U.S. Cl. .................................. 264/256; 264/257
[58] Field of Search ................... 264/46.5, 46.6, 71, 264/DIG. 43, 256, 257; 52/309; 428/306

[56] References Cited

U.S. PATENT DOCUMENTS

| | | |
|---|---|---|
| 2,425,883 | 8/1947 | Jackson . |
| 2,677,955 | 5/1954 | Constantinesco ............... 264/71 X |
| 3,047,908 | 8/1962 | Lundgren ................. 264/DIG. 43 |
| 3,258,861 | 7/1966 | Niconchuk ................. 264/46.6 X |
| 3,295,278 | 1/1967 | Muhm . |
| 3,402,520 | 9/1968 | Lee et al. ................... 264/46.5 X |
| 3,478,482 | 11/1969 | Weir ................................ 52/309 X |
| 3,491,171 | 1/1970 | French ............................ 264/46.5 |
| 3,608,007 | 9/1971 | Henrikson .................. 264/46.5 X |
| 3,653,170 | 4/1972 | Sheckler ........................ 52/309 X |
| 3,755,982 | 9/1973 | Schmidt .......................... 52/309 X |
| 3,770,859 | 11/1973 | Bevan ................................ 264/71 |
| 3,900,650 | 8/1975 | Sedore . |
| 3,936,987 | 2/1976 | Calvin .............................. 52/309 |
| 3,974,024 | 8/1976 | Yano et al. . |

FOREIGN PATENT DOCUMENTS

| | | | |
|---|---|---|---|
| 242233 | 2/1961 | Australia .............................. 264/46.5 |
| 2045743 | 3/1971 | France . | |
| 1030333 | 5/1966 | United Kingdom ................... 428/306 |

OTHER PUBLICATIONS

Ferrigno, T. H., "Rigid Plastic Foams", New York, Reinhold, c 1963, pp. 42–49.

*Primary Examiner*—Philip Anderson
*Attorney, Agent, or Firm*—Sprung, Felfe, Horn, Lynch & Kramer

[57] ABSTRACT

A monolithic-like, composite building module such as a wall panel having a core of rigid foam encased in a shell made of fiber reinforced cement. The composite module can be made by forming a supported open shell made of a hardened mixture of cement and fibers, introducing a rigid foamable polymer into the open shell, closing the open shell with a cover member made of a hardened mixture of cement and glass fibers and thereafter holding the cover member in place while polymer foam fills the interior of the enclosed shell.

7 Claims, 4 Drawing Figures

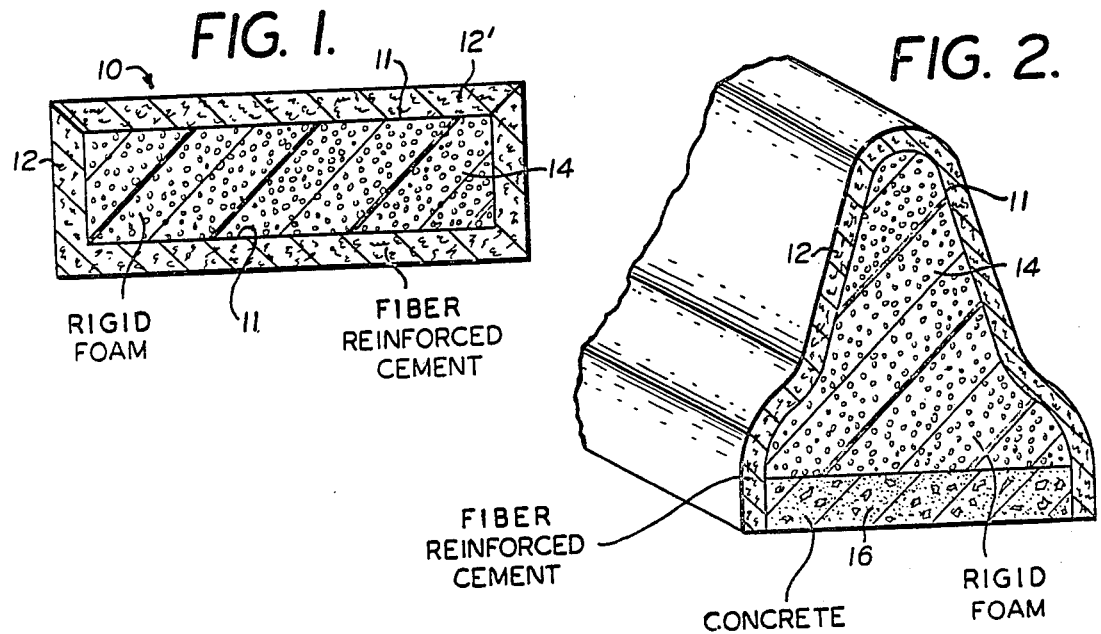
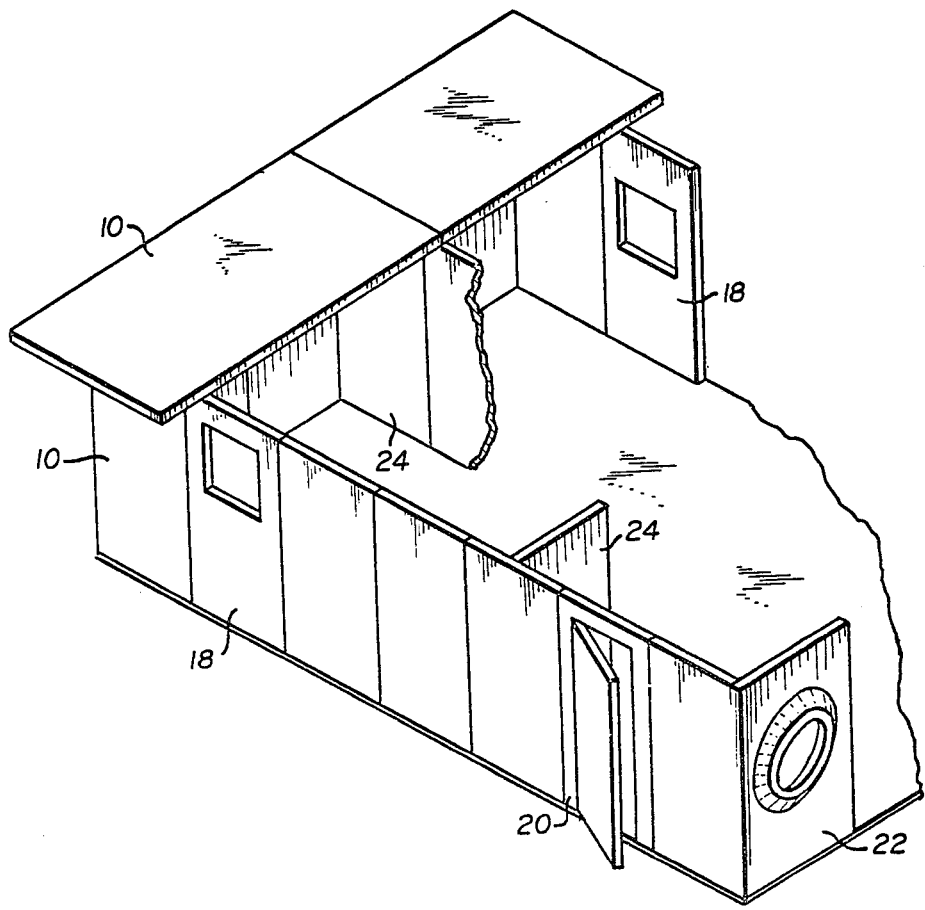

COMPOSITE BUILDING MODULE

RELATED APPLICATION

This application is a Continuation-in-Part of copending application Ser. No. 531,022 filed Dec. 9, 1974 now abandoned.

BACKGROUND

This invention relates to a composite building module which is similar to monolithic cast concrete modules in outward appearance and use, yet has significant improvements in insulating properties and weight reduction. More particularly, this invention relates to a composite building module having a rigid foam core, such as a rigid urethane polymer foam, encased or encapsulated in a shell made of a hardened mixture of cement and fibers, such as glass fibers.

Because of increased costs in material and labor, the construction industry has come to use prefabricated building modules, for example wall panels, roof decks and the like. A popular form of construction is known as "curtain-wall" construction and involves the use of a structural steel skeleton which is faced with stacked-up, prefabricated or precast panels. Such curtain-wall panels are commonly cast from reinforced concrete and are provided with a surface finish such as a smooth concrete finish or aggregate imbedded into the face of the panels. These panels are extremely heavy, for example a 4×8 curtain-wall panel cast from reinforced concrete weights from 1400-1600 lbs., and require heavy construction equipment to install. In addition, these panels provide very poor insulating properties and by themselves are a poor vapor barrier. This necessitates further construction to insulate and seal the stacked-up curtain-wall of precast concrete modules.

The construction industry has long sought improved building elements that will offer advantages in material and construction costs. A laminated structural element is described Muhim patent, U.S. Pat. No. 3,295,278, issued Jan. 3, 1967, as consisting of (i) a preformed plastic foam layer, (ii) one or more covering layers of aqueous binding material hardened to impart the strength required for a structure where the structural element is to be used, and (iii) mechanical means interlocking the foam covering layers into a unitary element. Heat insulation is imparted by the plastic foam layer while the required structural strengths are provided by the covering layer or layers.

In one embodiment a preformed plastic foam layer is sandwiched between two concrete layers which are connected through openings in the foam layer by a multiplicity of concrete dowels thereby interlocking the layers mechanically. In another embodiment, a covering layer of a hardened cement having a reinforcement of "wood fibers" therein is mechanically interlocked by a multiplicity of "micro-dowels" formed by the binder in surface crevices of the preformed plastic foam layer. The so-called "wood-fibers" providing the micro-dowels have a length of 35-50 cm (approximately 14-20 inches).

Another proposal for a laminated insulating panel is set forth in British Pat. No. 1,030,333 and involves a preformed insulating layer which is surfaced on one or both sides with at least two layers of cement between which is embedded a glass fiber fabric web. The insulating or core layer, which can carry a static load, is made from a mixture of Portland Cement, an aqueous plastic dispersion, sand and a lesser amount of waste foam formed when foamed plastic parts are sawed. The covering layers are made of similar mixture without sand using greater amounts of waste foam.

A real problem encountered in making laminated panels using preformed plastic foam cores (e.g., polystyrene foam) is the lack of adhesive bond between the core and the covering layer. Muhim attempts to cope with this by providing a mechanical interlock using dowels or micro-dowels to form a unitary element. He also contemplates an extra bonding film to improve adhesion. In the British patent, the covering layers contain a binder which will provide a bond with the insulating core. The use of like materials in both the core and the covering layers makes this possible.

The present invention provides a monolithic-like building module which is extremely light in weight as compared to precast concrete panels for example, and which has greatly improved insulating and vapor barrier properties per se. Because the present invention utilizes an in situ foamed core, an adhesive interlock between core and shell is formed which is stronger than either material by itself. The chemical foaming reaction that takes place, plus the fact that foaming takes place in an enclosed shell under retention, results in an overall intimate adhesive interlock and a prestressed structure wherein the shell is under tension and the core is under compression. This means that the shell and core are now united together into a monolithic-like structure that has far greater strengths (because of the overall adhesive interlock) than prior laminated panels using preformed foam plastic cores, and, at the same time, is light in weight and has excellent insulating and vapor barrier properties.

SUMMARY

The monolithic-like composite building module of the invention comprises a core of rigid foam, preferably a rigid urethane polymer foam core completely encased in an enclosed shell made of a fiber reinforced cement, said shell containing from about 1 to 40% by volume of fibers, preferably 2 to 15% by volume glass fibers, having a length of from about ⅛ to about 1 inch, preferably from about ⅜ to about 1 inch, and being substantially uniformly distributed in a random fashion throughout substantially the entire volume of said shell, said core being formed within the enclosed shell by the chemical reaction of components of a foamable polymer composition which is foamed in situ under pressure to form an encased rigid foam core intimately adhesively interlocked, via the in situ foaming reaction, over its entire surface area with the shell over its entire interior area. The in situ foaming reaction under pressure results in a module with a rigid core under compression and an encasing shell under tension.

The exterior of the shell can be provided with any desired surface finish including aggregates such as stone or marble chips embedded in one or more surfaces thereof and the module can be used in the same manner as precast concrete modules, without, however the need for heavy construction equipment and further steps to impart insulating and vapor barrier properties thereto.

The composite building modules of the invention can be made in one embodiment by forming an open supported shell made of a hardened mixture of cement and fibers, preferably glass fibers, introducing a foamable polymer, preferably a foamable rigid urethane polymer, into the open shell, closing the shell with a cover member (made of a hardened mixture of cement and fibers) before the polymer begins to foam, or before the foaming polymer fills the open shell, and thereafter supporting and holding the shell and cover member in place while polymer foam fills the interior of the enclosed shell.

Because the shell is enclosed, foaming within the interior takes place under pressure and this, plus the chemical foaming reaction, contribute to the formation of the adhesive interlock between the core and the shell and the creation of a prestressed structure. In situ foaming within the enclosed shell involves restraint during the act of foaming which is a dynamic, expansive operation. The force of expansion causes the foam to penetrate the pores of the reinforced cement shell. The phrase "adhesive interlock" is used herein to describe this and will be understood as the interfacial penetration of the rigid foam core into the shell interior to unite the two into a monolithic-like unit through a combination of mechanical, chemical and adhesive forces.

In another embodiment, a rigid foam core, preferably a rigid urethane polymer foam core, is encased in a shell made from a hardened mixture of cement, preferably also containing particulate inert fillers such as sand, and fibers, preferably glass fibers, and the shell is formed in situ around the core such that the mixture of cement and fibers penetrates and bonds with the surface of the core providing a positive interlock between the core and shell. The shell contains from about 5 to about 50% by volume of reinforcing fibers, having the same length as described above, which are substantially uniformly distributed in random fashion throughout substantially the entire volume of the shell.

DESCRIPTION OF THE DRAWING

The present invention will be more fully understood from the following description taken in conjunction with the accompanying drawing wherein;

FIG. 1 is a cross-sectional view of a typical composite building module of the present invention;

FIG. 2 is a cross-sectional view partly in perspective and partly broken away of a composite building module of the invention shown in the form of a highway barrier with a weighted base;

FIG. 3 is a perspective view partly broken away of a partly assembled building illustrating various ways in which the composite module of the invention can be utilized in the construction of a building.

DESCRIPTION

Figure 4:
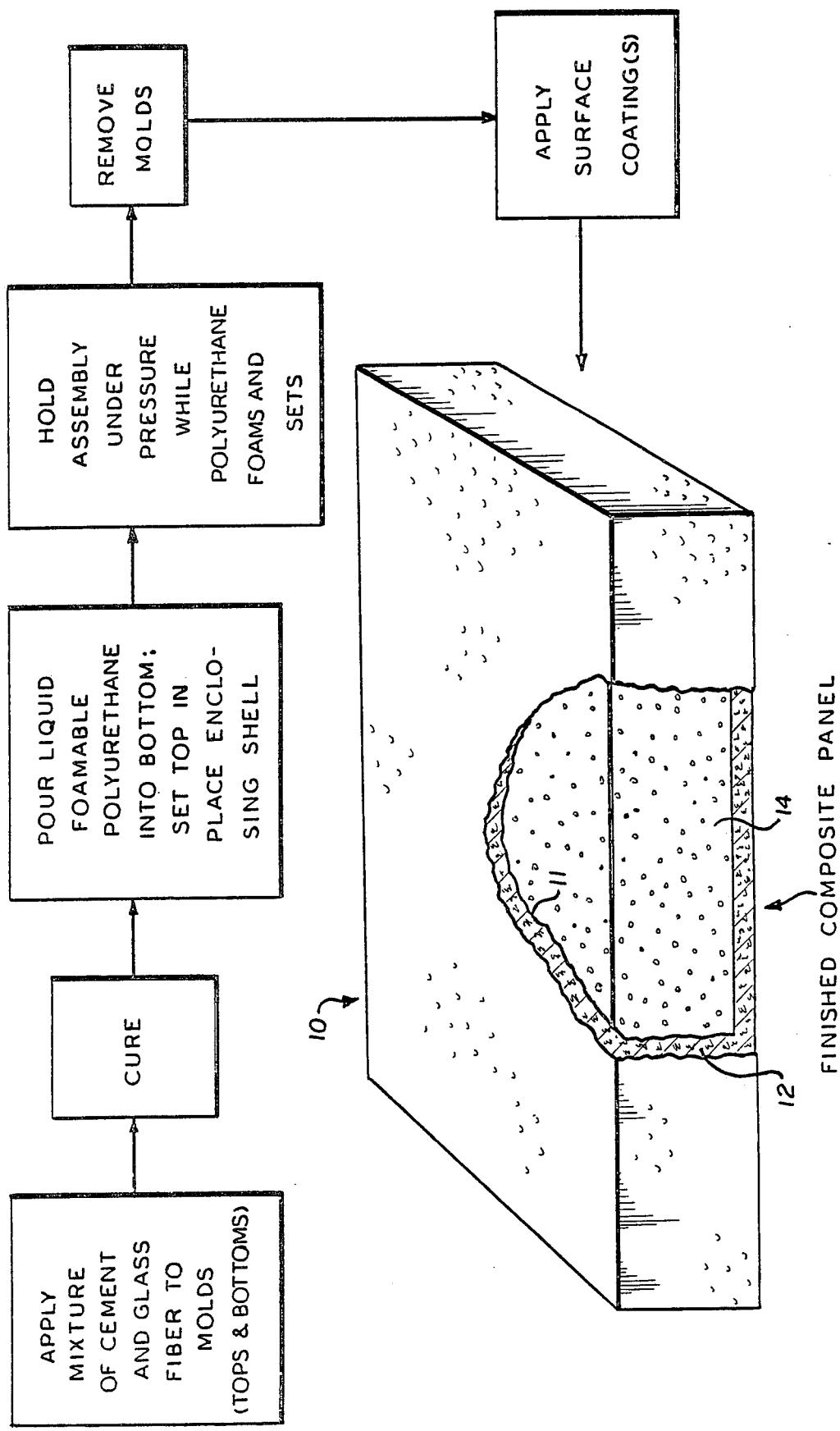
FIG. 4 is a flow diagram for the process of the invention.

Preferred hardenable mixtures for the invention are mixtures of cement, inert particulate filler and glass fibers containing 5–50% or more by volume glass fibers. Mixtures of cement and fibers with lengths of from about ¼ to about 1 inch, or longer, can be used in the invention. Suitable fibers, in addition to glass fibers, include organic and inorganic synthetic fibers such as Dacron, Nylon, graphite and the like. Suitable inert particulate fillers include sand, pumice, stone dust, and the like. They can be used in amounts of from about 10 to about 30% by volume.

The cement/fiber mixtures can contain conventional additives such as lime and strates for water resistance and latex for added strength.

Suitable rigid foams include inorganic and organic foams. Preferred are foams that can be formed in situ such as rigid polymer foams. Rigid urethane foams are preferred and are well-known and widely used principally for insulation purposes. Such foams are commonly created on site by combining the reactants (a polyol and an isocyanate) using air-less spraying or liquid application techniques. Foaming commences almost instantaneously and is completed within a very short period of time, depending on the type of urethane composition employed. The density of rigid urethane foams also depends on the nature of the urethane composition employed but generally ranges between 1.5 lbs. per cu. ft. to 10 lbs. per cu. ft., more commonly from 2 to 5 lbs. per cu. ft. Because of the lightweight closed cell structure of rigid urethane foams, they also have structural strength. Other suitable rigid foams include polyester foams, phenolic resin foams, isocyanurate foams, and the like.

The present invention combines a hardenable mixture of cement and fibers with rigid foams and provides a surprisingly strong and self-supporting building module which is light in weight and has outstanding insulating and vapor barrier properties.

The invention will now be described with reference to the drawing and the preferred embodiment of a rigid urethane foam polymer core and a cement/glass fiber shell.

FIG. 1 of the drawing shows a typical building module in cross-section and the component parts are shown in exaggerated proportions for ease in understanding. Thus, the building module of the invention has a rigid urethane polymer foam core 14 encased or encapsulated in a shell 12 made of a hardened mixture of cement and glass fibers. The finished, monolithic-like module is indicated generally by the reference numeral 10. FIG. 2 shows a particular application wherein the building module is in the form of a highway barrier preferably having a weighted concrete base 16.

An important feature of the present invention is the encapsulation of the rigid foam core 14 by the outer shell 12 and the formation of an intimate adhesive bond 11 between the core 14 and the shell 12 preferably over the entire surface area of the core 14 but depending on how the module is made, the intimate adhesive bond can be formed over a major portion of the interface between the core 14 and the shell 12. Because the rigid foam core 14 is formed in situ, the foaming rigid urethane polymer enters and fills surface irregularities such as pores and surface outlined glass fibers and provides an intimate, preferably overall, rigid interfacial adhesive interlock between the rigid foam core and the shell 12.

Depending on the intended use for the building module of the invention, the shell 14 can have a thickness ranging from about ⅛th in. to 1 in. or more. The thickness can be greater or less than this range again, depending upon the ultimate use intended for the building module. For curtain-wall panels, the shell 14 preferably has a thickness of from ¼ in. to ⅜ in.

Likewise, the rigid foam core 14 can range in thickness from about 1 in. to 10 in. or more and this can be greater or less depending on the structure involved and the intended use. The building modules themselves can be made in almost any size ranging from small modular units up to relatively large curtain wall units or roof deck members.

FIG. 3 shows just a few of the many ways in which the building module of the invention can be employed.

Because building modules of the invention are like monolithic modules in outward appearance and use, yet self-insulating, the modules of the invention can be used in the same fashion using the same construction and installation techniques as monolithic concrete modules. Thus, the composite module of the invention 10 can be used as a wall panel or roof deck member as shown in FIG. 3. The wall panels can be provided with window openings as in panels 18 and 22 or door openings as per panel 20. The modules of the invention can also be used as interior partition wall panels 24 as well as other numerous uses. Because of the light weight of the module of the invention, great savings can be realized in the load bearing structure of buildings. Thus, for example, in a multi-story, curtain-wall building, considerably less structural steel will be needed to support the exterior panels as compared to the structural steel required to support precast concrete panels.

The facing surfaces of the composite panel 10 can be provided with any finish, texture or design which can be imparted via the finish or design of the mold surfaces or by imbedding or adhering aggregate such as gravel, broken stone, marble chips and the like to one or more surfaces of the shell 12. It is also possible to incorporate aggregate such as sand, gravel, broken stone and marble chips into the mixture of cement and glass fibers before forming the shell 12 for increased strength and also to attain desired surface textures or finishes.

The composite building module as shown for example in FIG. 1 can be made by forming an open supported shell 12 having a bottom and side walls and open at the top. A wooden form can be built up to define one face and the side and end walls of a 4'×8' panel and a trowelable mixture of cement and 35–45% by volume glass fibers can be applied by hand to the interior surfaces of the wooden form thereby building up the shell 12 to the desired thickness, for example, from ⅛th in. up to ½ in. thick or greater. The core 14 can then be formed in situ using an air-less spraying technique until the foam is built up to the top of the open shell. The foam can then be trimmed and the remaining face of the panel 12' applied by hand using the same trowelable cement/glass fiber composition. Forming the building module in this fashion ensures an intimate adhesive bond as described previously with the end and side walls and one face of the shell. Because the core is already formed when the completing face of the shell 12 is applied, the adhesive bond is not as strong as the intimate interfacial adhesive bond formed by in situ foaming of the rigid foam.

It is preferred to introduce a flowable foamable rigid urethane polymer composition into the open shell 12 and then close or complete the shell with a cover member or panel 12' also made of a hardened mixture of cement and glass fibers of the desired thickness. The cover member 12' is applied before the polymer begins to foam, or foaming fills the shell, and is supported in back and held in place while the polymer composition foams in the completely encased interior of the shell 12 thereby filling same and providing an overall rigid-interfacial adhesive interlocked between the rigid foam core 14 and the interior of the shell 12 and cover 12'. As is known, a liquid or flowable urethane polymer compositon exerts an outward pressure when caused to foam within a confined space such as the shell and this can be used to advantage in the present invention to ensure and promote an intimate overall rigid interfacial interlock between the entire exterior surface area of the rigid foam core 14 and the entire interior surface area of the shell made of a hardened mixture of cement and glass fibers and create a stable structural stress throughout the module.

A preferred method for making the composite building modules of the invention will now be described with reference to FIG. 4 of the drawing. At a first station, metal or glass fiber/polyester molds, preferably with fold down ends to facilitate product removal, in the form of tops and bottoms, have applied thereto a mixture of cement and glass fiber perferably containing 35-40% by volume glass fiber. The mixture of cement and glass fiber can be premixed dry and water subsequently added to provide a viscous mixture. This mixture can then be sprayed into the mold interiors or applied by hand.

In a preferred embodiment, hot wet cement (made with water at about 120°–200° F., e.g., 180° F.) without glass fiber is applied to or sprayed into the interior of the molds which already has a lining of glass fiber chopped from continuous rolls and sprayed or applied to the interior of the molds. The molds can the be vibrated to disperse the lighter glass fibers through the wet cement to obtain uniform distribution throughout the entire volume of the cement layer in the molds. Because the glass fiber is lighter, it rises in the wet cement; vibration is stopped when distribution is complete. Following this, or at the same time, the mixture of glass fiber and cement in the molds can be pressed with a forming member to distribute the cement/glass fiber mixture within the interior of the molds. Also, if desired, suction can be applied to the mold walls to remove water.

At the same time the glass is chopped and sprayed, a coating can be applied thereto by spraying, for example, with a polyester in a water miscible solvent such as alcohol, to impart alkali resistance to the fibers.

The molds are then fed to a curing line. If hot cement is used, oven curing can be eliminated. Oven curing generally requires about 6 hours to produce a hardened shell for the glass fiber reinforced cement tops and bottoms; curing time for hot cement is generally 50% less.

Next, with the hardened bottom portion of the shell still supported by its mold, a flowable, foamable rigid urethane polymer composition is poured into the open shell and the top is then set in place before substantial foaming begins. The top can be removed from its mold at this point or it can continue to be supported by the mold. With the top in place, the mold supported assembly is then held under pressure while the urethane polymer foams and sets. This can be accomplished using a hydraulic plated press or other restraint device.

After the urethane polymer foam sets, filling the shell and providing an overall rigid interfacial adhesive interlock between the rigid foam core and the interior of the shell, the panel is removed from the bottom mold and the top mold (if not previously removed).

After removing the mold or molds, the composite panel is ready for use or can have a surface finish applied. Preferably, the surfaces of the panel have applied thereto, using electrostatic coating techniques for example, a sealer, such as a polyester type of sealer. While the panel itself is substantially water proof, the application of a sealer insures that the panel will maintain its water proofness. If desired, in addition to or in place of a sealer, the panel can be painted, stained or other types of coatings can be applied, for example, to provide for easy removal of graffiti. It has also been found that a sealer, when applied in a thick coating, can also be used to adhere aggregate to a surface of the panel to provide a surface finish.

Modules with pre-formed cores can be made by placing an insert or blank member which approximates the top area of a panel into the bottom of a mold of desired configuration, such blank being smaller in peripheral shape than the mold. A core member of polyurethane foam is then placed on top of the blank, such a core having approximately the same shape as the blank, that is, smaller than the mold interior. A wet mixture of cement and 1% to 40% by volume glass fibers is then applied (preferably hot, e.g., 120°-200° F.) to the top and four sides of the core. After curing the mold is removed, the semi-finished panel is inverted and the blank is removed. The top of the panel is then formed by filling in the blank space with the same wet mixture followed by curing. In forming the top of the shell (where the blank was) it is important that the wet cement/glass mixture extend from the top down over the already formed sides. This insures that a good bond will be formed between the earlier formed shell and the top thereof which is due to the fact that the reinforcing function of the glass fibers is brought into play in this fashion. The extension down over the sides can be done by troweling: the extensions over the sides is generally one, two or more inches and tapers down to a feather edge from a thickness of about ⅛ to ½ the shell thickness.

A preferred alternate to the foregoing is to apply a layer of a wet mixture of cement and 1% to 40% by volume glass fibers to the bottom of the mold, laying in a foam core which is smaller than the mold interior, applying the same wet mixture down into the side spaces and the top and then vibrating the entire assembly. Glass fibers can be put into the mold first (using only wet cement) before applying the bottom layer, then down the sides and onto the top of the core before applying the remaining cement. Vibration causes the lighter fibers to rise in the wet cement and thereby become evenly distributed throughout the shell.

In the embodiment of FIG. 1, the juncture between the open shell 12 and the cover or top 12' can be formed at roughly 45° angles as shown, or any combination of right-angles can be employed, including a set-in or overlapping configuration. Where the two members 12 and 12' come together as shown in FIG. 1, the mating edges can be formed to leave a slight gap so that foaming polymer can enter therein during the foaming operation.

Many modifications can be made in the composite building modules of the invention without departing from the spirit and scope hereof. For example, the rigid foam core 14 can be reinforced utilizing woven or non-woven screen and mesh layers made of synthetic fibers or metals and prestressing techniques can be employed if desired. As mentioned previously, one or more exterior surfaces of the shell 12 can be provided with any desired finish, texture or design or can be embedded with inorganic aggregates such as gravel, broken stone, marble chips and the like. As for surface design and texture, the exterior of the shell 12 will conform to the finish of the mold surface to achieve desired effects, for example, a wood grain appearance and the like. The shell 12 can also be formed with molded-in mounting or building clips and/or grooves.

As mentioned previously, the composite building module of the invention can be used and installed in the same manner as conventional building modules such as curtain-wall panels but with a great reduction in weight (and simplified installation procedures). Because of the greatly improved insulating and water vapor barrier properties of the modules of the invention, no further steps have to be taken to ensure these properties as is the case with conventional building modules.

In roof deck installations or curtain-wall installations, a room temperature curing elastomer such as a silicone elastomer can be used for edge to edge bonding between adjacent modules and the entire installation can be provided with an overcoating of a suitable elastomer. This provides for a shock resistant installation which can also compensate for later movement of a structure, for example, as a building settles after construction.

Because the composite building modules of the invention are extremely light as compared to conventional monolithic cast concrete modules, fewer structural members are necessary for supporting, for example, a curtain-wall made of panels of the present invention and a roof deck made of panels of the present invention. For example, a 4'×8' precast concrete module weighs from about 1400–1600 lbs., whereas a comparable composite module made according to the invention weighs only about 100–150 lbs. depending on the thickness of the shell 12. Thus, great savings can be realized in not only installation procedures but also in the strength requirements for the supporting superstructure.

In addition to the uses illustrated in FIGS. 2 and 3 of the drawing, the composite module in the invention can be formed into insulated pipes and conduits, railroad ties, modular walls and even load bearing modular panels which can incorporate conduits for utilities, window frames, door frames and the like. It should also be noted that the composite building panel of the invention is buoyant because of the rigid foam core 14 which property can be utilized to advantage in the construction of floating docks and wharfs as well as offshore drilling platforms.

It is known that a ⅛th in. or ¼ in. coating of a hardened mixture of cement and glass fibers gives acceptable fire ratings to the underlying coated base. Thus, in a preferred embodiment of the invention, rigid urethane polymer foams are provided with acceptable fire ratings by forming a laminate of a layer of rigid urethane polymer foam with an outer covering layer made of a hardened mixture of cement and glass fibers.

Foamable urethane compositions forming rigid urethane olymer foams are commercially available in a wide range of chemical and physical properties. Such compositions generally contain an isocyanate component containing reactive isocyanate groups, a polyol component containing one or more polyols, catalytic agents and preferably a flame or fire resistant agent such as trichloromonofluoromethane. Typical properties of rigid urethane polymer foams available commercially are set forth in the following table:

TYPICAL RIGID URETHANE FOAM PROPERTIES

| Density lb./cu.ft. Astm D 1622 | Compressive Strength psi Astm D 1621 | Compressive Modulus psi Astm D 1621 | Shear Strength psi | Shear Modulus psi |
| --- | --- | --- | --- | --- |
| 1.5–2.0 | 20–60 | 400–2000 | 20–50 | 250–550 |
| 2.1–30 | 35–95 | 800–3500 | 30–70 | 350–800 |
| 3.1–45 | 50–185 | 1500–6000 | 45–125 | 500–1300 |

| Density lb./cu.ft. Astm D 1622 | Compressive Strength psi Astm D 1621 | Compressive Modulus psi Astm D 1621 | Shear Strength psi | Shear Modulus psi |
|---|---|---|---|---|
| 4.6–70 | 100–350 | 3800–12,000 | 75–180 | 850–2000 |
| 7.1–10.0 | 200–600 | 5000–20,000 | 125–275 | 1300–3000 |

Suitable foamable urethane compositions are sold by Witco Chemical Corporation, New Castle, Del., and by Owens-Corning Fiberglas Corp., Toledo, Oh.

What is claimed is:

1. Process for making a monolithic-like, insulated composite building module having a fiber-reinforced, continuous and integral cement shell encasing a rigid foam core which comprises:
   (a) providing a mold having a bottom and side walls;
   (b) successively applying individual lengths of fibers and wet cement to the bottom of the mold, said fibers being applied by chopping rolls of continuous fiber and spraying the chopped fibers into the mold;
   (c) substantially uniformly distributing the chopped fibers in a random fashion throughout the entire volume of the wet cement applied in step (b) to form a layer of wet cement and fibers in the bottom of the mold;
   (d) placing a rigid foam core member on said layer of wet cement and fibers, said core member having a peripheral shape smaller than the mold interior leaving a free space between the core member and the mold side walls, said core member having a thickness less than the height of the mold side walls;
   (e) successively applying individual lengths of fibers and wet cement to the top of the core member and the free space between the member and the mold side walls, said fibers being applied by chopping rolls of continuous fiber and spraying the chopped fibers into the mold;
   (f) substantially uniformly distributing the chopped fibers in a random fashion throughout the entire volume of the cement applied in step (e) thereby encasing said core with a wet cement shell that is continuous, integral around the core and fiber reinforced; and
   (g) curing said wet cement shell and removing the thus formed module from the mold.

2. Process of claim 1 wherein the cement used in steps (b) and (e) contains an inert, particulate filler such as sand.

3. Process of claim 1 wherein the reinforced cement shell encasing said rigid foam core has a thickness of from one-eighth to one inch.

4. Process of claim 1 wherein said rigid foam core member has a thickness of from one to ten or more inches.

5. Process of claim 1 wherein said rigid foam core member is made of rigid urethane polymer foam.

6. Process of claim 1 wherein said fibers used in steps (b) and (e) are glass fibers.

7. Process of claim 1, wherein the step of distributing in steps (c) and (f) comprises vibrating the mold while applying the fibers and wet cement.

* * * * *